March 23, 1971     L. C. FRIEND     3,572,242
CARD READER IMPRINTER

Original Filed April 26, 1966     6 Sheets-Sheet 3

INVENTOR.
LINDSAY CARLTON FRIEND
BY Curtis, Morris + Safford

March 23, 1971  L. C. FRIEND  3,572,242
CARD READER IMPRINTER
Original Filed April 26, 1966  6 Sheets-Sheet 4

INVENTOR.
LINDSAY CARLTON FRIEND
BY Curtis, Morris & Safford

March 23, 1971     L. C. FRIEND     3,572,242
CARD READER IMPRINTER
Original Filed April 26, 1966     6 Sheets-Sheet 5
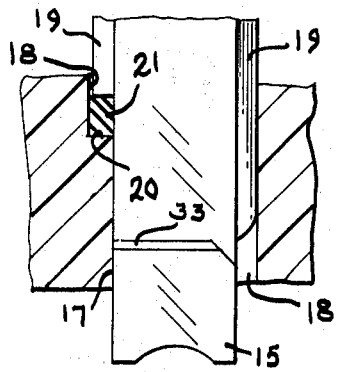
Fig. 6a
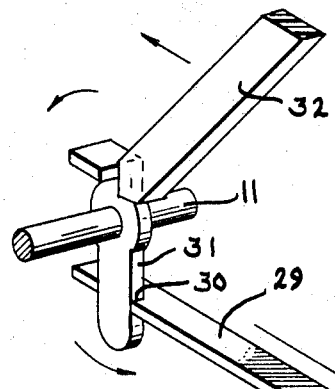
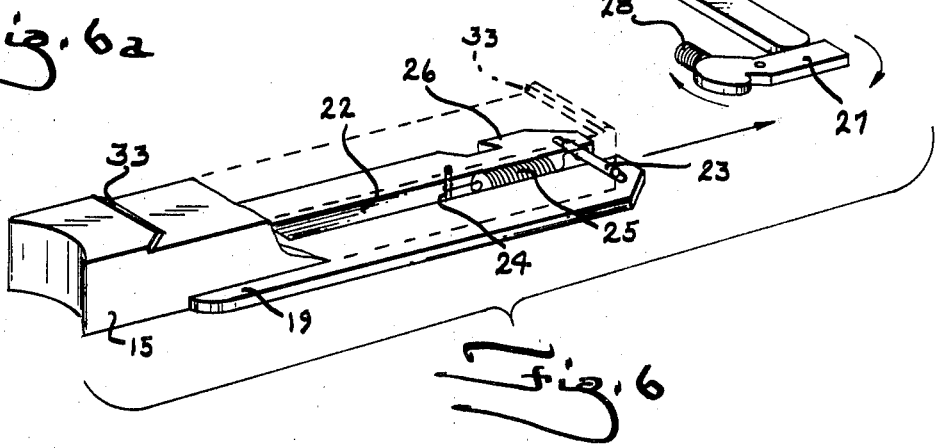
Fig. 6
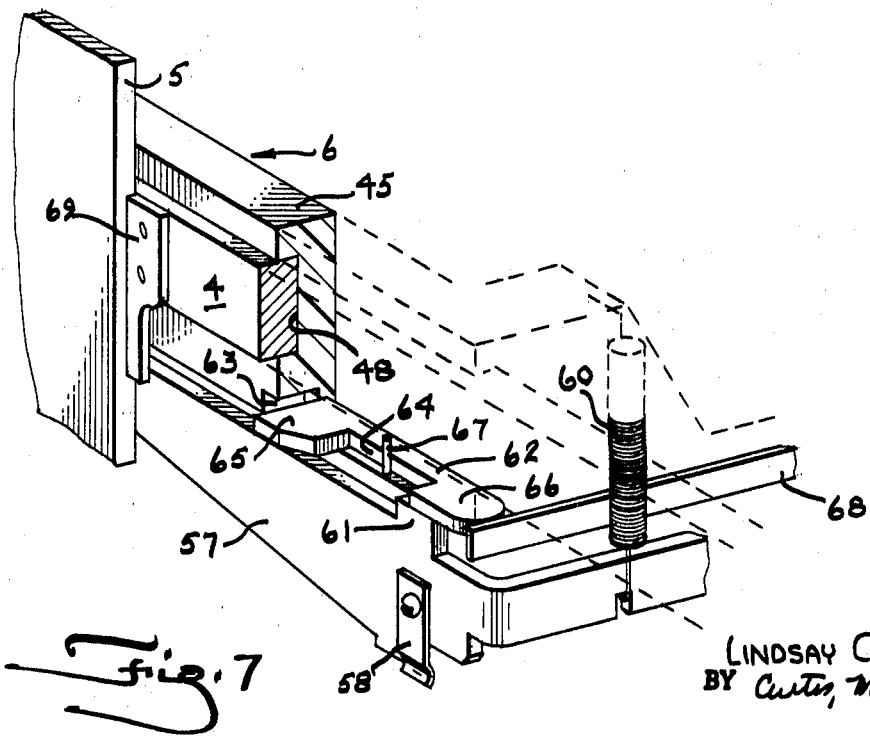
Fig. 7
INVENTOR.
LINDSAY CARLTON FRIEND March 23, 1971 L. C. FRIEND 3,572,242
CARD READER IMPRINTER Original Filed April 26, 1966 6 Sheets-Sheet 6

INVENTOR.
LINDSAY CARLTON FRIEND
BY

United States Patent Office 3,572,242
Patented Mar. 23, 1971

3,572,242
CARD READER IMPRINTER
Lindsay Carlton Friend, Camp Hill, Pa., assignor to AMP Incorporated, Harrisburg, Pa.
Continuation of application Ser. No. 545,391, Apr. 26, 1966. This application July 14, 1969, Ser. No. 849,229
Int. Cl. B41f 3/04
U.S. Cl. 101—269                   11 Claims

ABSTRACT OF THE DISCLOSURE

A card reader imprinter comprises reading means for electrically reading coded information on a data card, printing means for printing printable information on the data card onto a card to receive the printable information, and carrying means carrying the printing means and for operating the reading means.

---

This is a continuation of my copending U.S. patent application Ser. No. 545,391, filed Apr. 26, 1966 and now abandoned.

This invention relates to a card reader and more particularly to a card reader imprinter.

Data cards, especially credit cards, having coded information are being used in an ever increasing number in business or other areas. One area of special interest is that of credit capability, i.e. to determine the credit capability of customers before sales are made thereto. Expanded and necessary use of credit cards has created the following drawbacks: losses experienced as a result of bad debts, interest on delinquent accounts receivable and fraud. These drawbacks affect the net profit of any business. Determining the credit capability of customers in a small amount of time is therefore a major consideration of business.

An object of the invention is to provide a card reader imprinter to read the coded information of a data card and imprint the information of the data card onto a copy slip.

Another object of the invention is the provision of a card reader imprinter to validate the credibility of a card holder.

A further object of the invention is to provide a card reader imprinter that automatically reads the coded information of a data card and automatically prints the information of the data card if the data card holder's credit is verified.

An additional object of the invention is the provision of a card reader imprinter that automatically reads the coded information of a data card and automatically does not print the information of the data card if the data card holder's credit is not good.

A still further object of the invention is to provide a card reader imprinter that will automatically operate upon the proper insertion of a data card and a copy slip within the card reader imprinter.

Still an additional object of the invention is to provide a card reader imprinter that is simple to operate, has a fast response time and can be incorporated into an existing credit system.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing and other objects are achieved by a preferred embodiment of a card reader imprinter comprising a card-receiving area to receive a card to be read, contact means in the card-receiving area to read coded information on the card, a card-receiving section to receive a card on which information on the card to be read can be imprinted with the card-receiving area being located relative to the card-receiving section so that the information on the card to be read can be printed on the card to receive the information, and printing means movable along the card-receiving area and the card-receiving section to print the information on the card to be read onto the card to receive the information. Means are also provided to prevent the printing means from printing the information on the card to be read onto the card to receive the information. Means are further provided to automatically operate the printing means when the card to be read and the card to receive the information are in position in the card-receiving area and the card-receiving section respectively.

In the drawings:

FIG. 6 is a perspective view of the latching means for latching the movable section of the card-reading area in position;

FIG. 6a is a partial cross-sectional view illustrating the movable section of the card-reading area in a normally inoperative position;

FIG. 7 is a partial perspective view of the latching means to latch the printing means in a printing position;

Figure 1:
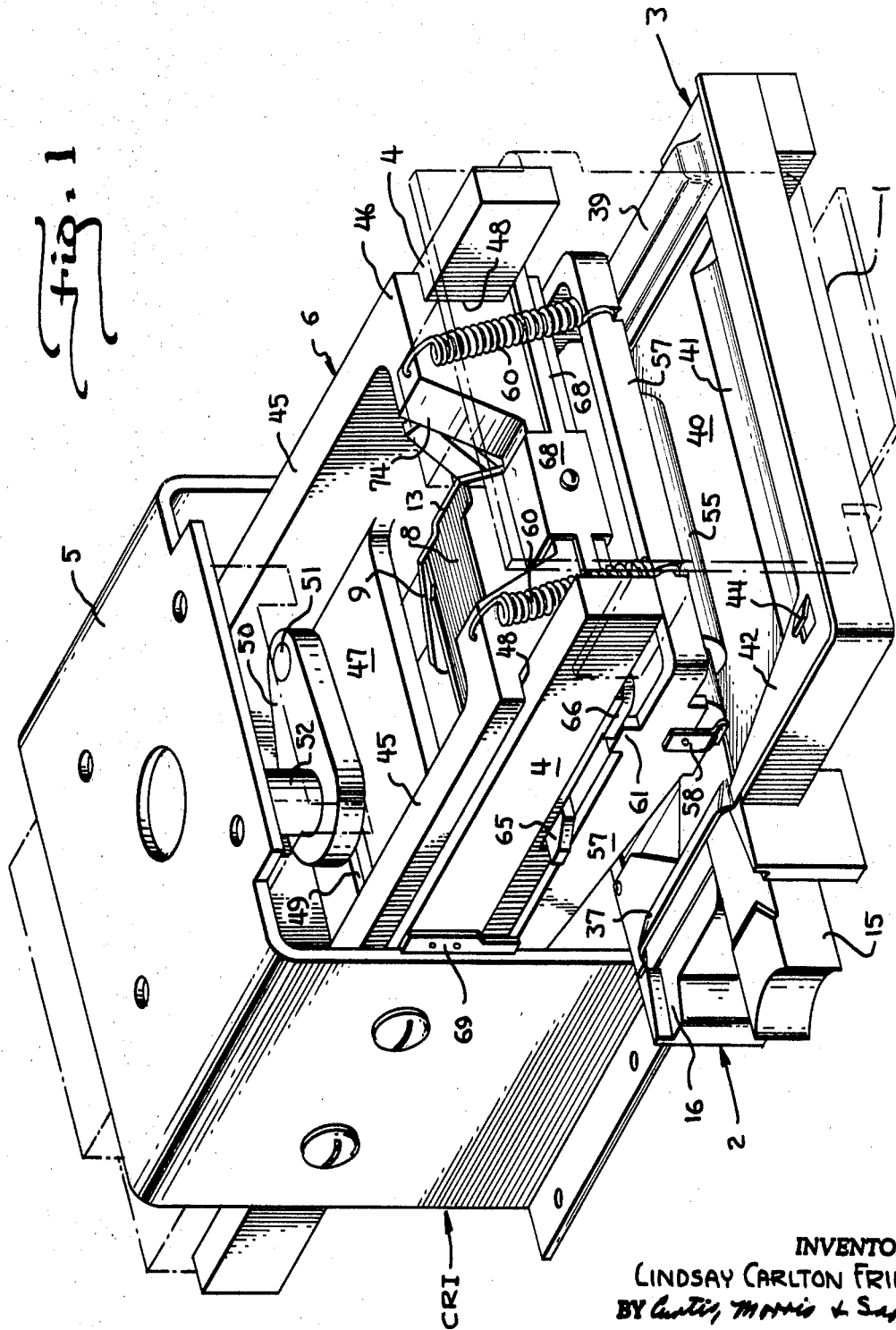
FIG. 1 is a perspective view of the card reader imprinter.
Figure 2:
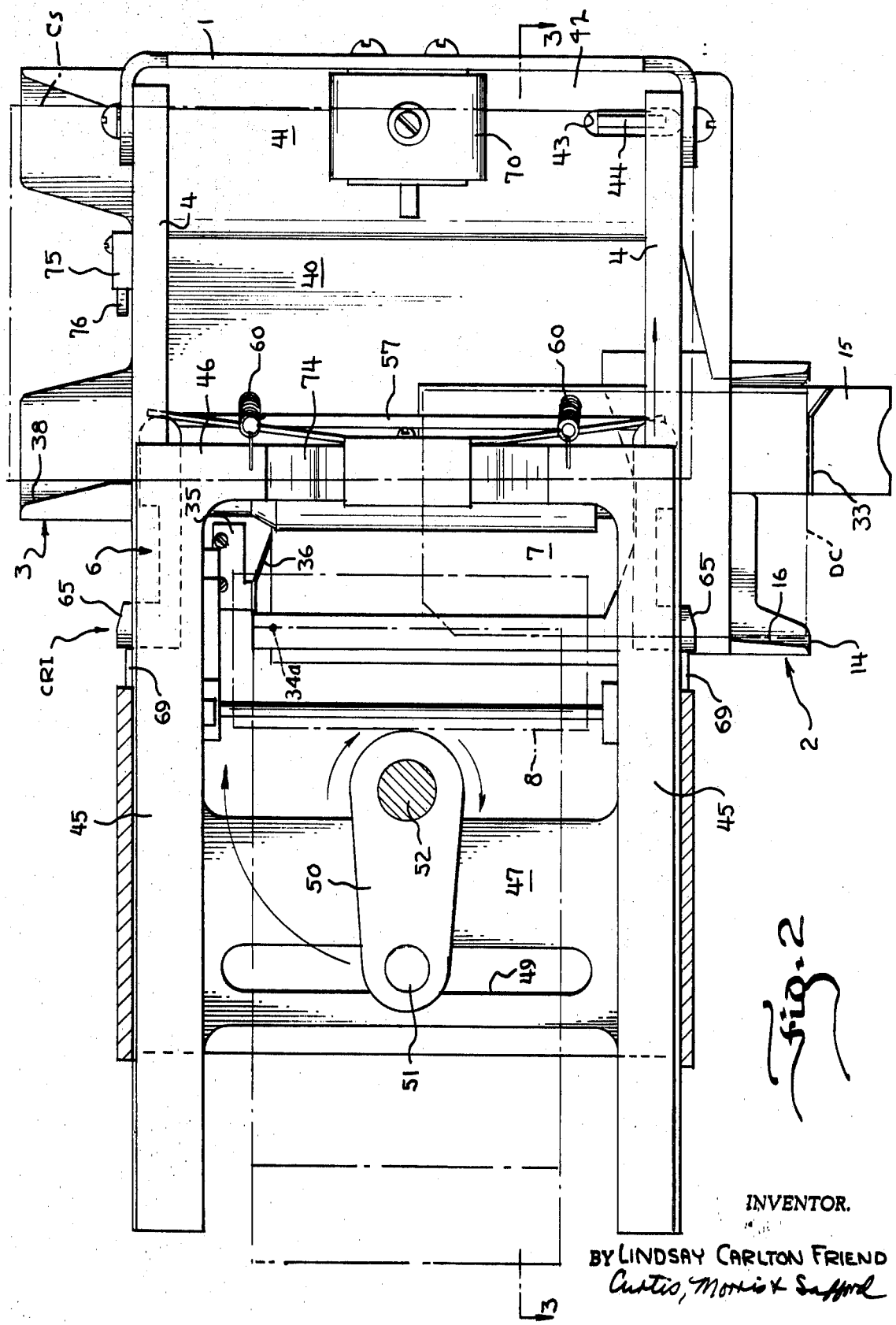
FIG. 2 is a top plan view of the card reader imprinter.
Figure 3:
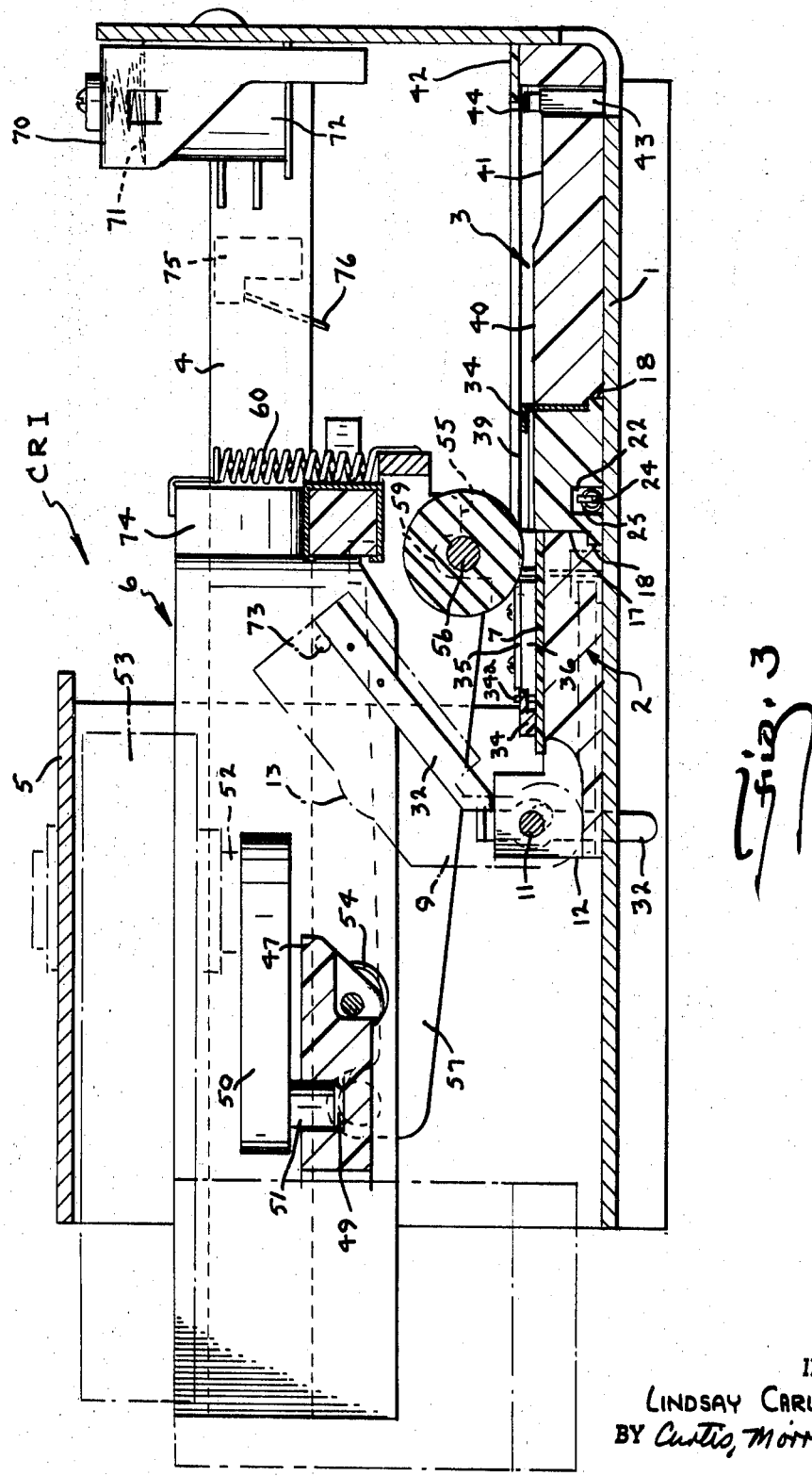
FIG. 3 is a view taken along lines 3—3 of FIG. 2.
Figure 4:
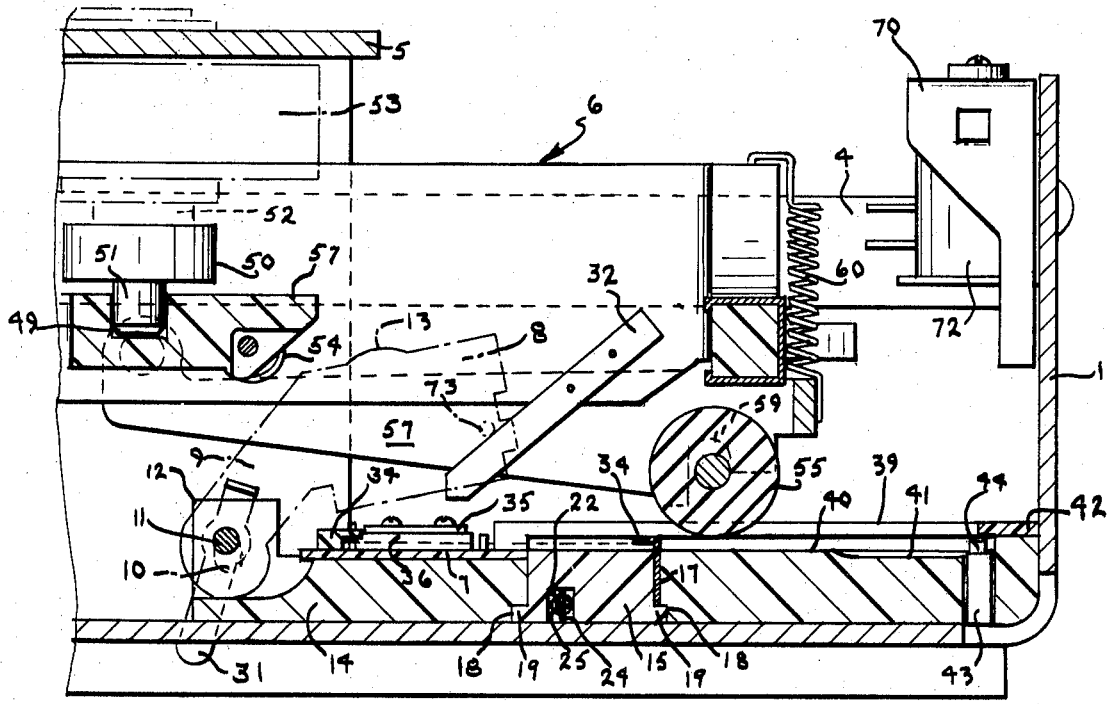
FIGS. 4 and 5 are partial cross-sectional views similar to FIG. 3 but illustrating different stages of operation of the card reader imprinter.

Turning now to the drawings, FIGS. 1 and 2 illustrate a card reader imprinter CRI but without a cover means therefore. Card reader imprinter CRI comprises an L-shaped base member 1 with the long leg having disposed thereon a data card-receiving area 2 and a slip copy-receiving section 3. Card-receiving area 2 defining an area in which a card having coded and printable information thereon to be read is inserted and slip copy-receiving section 3 defines a card-receiving section in which a card on which the printable information on the coded card is to be printed is inserted. The short leg of base member 1 has one end of carriage-carrying members 4 secured thereto. A U-shaped motor carrying member 5 has the ends of its legs secured to base member 1. The other ends of carriage-carrying members 4 are secured to motor carrying member 5. A carriage 6 is carried by carriage-carrying members 4 and is movable therealong.

A contact assembly has a stationary contact section 7 disposed in data card-receiving area 2 and a movable contact section 8 movable relative thereto. Arms 9 are secured to the ends of movable contact section 8 and are pivotally connected via elongated openings 10 through a shaft 11 secured in projections 12 of card-receiving area 2. The contact assembly is of the type disclosed in the U.S. patent application of Winfield W. Loose, Ser. No. 441,179, filed Mar. 19, 1965, now Pat. No. 3,513,299, and assigned to the present assignee, which provides contact members having a redundant capability. Each of arms 9 has an arcuate extension 13, the purpose of which will be described hereinafter.

Card-receiving area 2 comprises a stationary section 14 and a movable section 15. Stationary section 14 is provided with an entrance 16 and a slot 17 having recesses 18 in communication therewith. The front of stationary contact section 7 is disposed adjacent slot 17. Movable section 15 is movably disposed in slot 17 and includes extensions 19 matable with recesses 18 to maintain movable section 15 in position. As can be discerned from FIG. 6a, one of extensions 19 is shorter than the other extension. Recess 18 in which this short extension is matable has a surface 20 having a force absorbing member 21 secured thereagainst so that the end of short extension 19 abuts thereagainst to limit the outer movement of movable section 15.

A channel 22 is disposed in the bottom surface of movable section 15 and a pin 23 is disposed in movable section 15 across the outer end of channel 22 as illustrated in FIG. 6. A pin 24 is secured in base member 1 and is disposed in channel 22. A spring 25 is connected between pins 23 and 24 so as to maintain movable section 15 in its normally inoperative position as illustrated in FIG. 6a. A hook section 26 is located on a front side of movable section 15 and is engageable with a spring biased hook member 27 pivotally mounted on base member 1 in alignment with hook section 26. When movable section 15 is moved inward against the bias of spring 25, hook section 26 is latchably secured on hook member 27 in order to maintain movable section 15 in a card reading position. A spring 28 maintains hook member 27 in a latched position.

A lever 29 is movably mounted in a slot (not shown) in stationary section 14. One end of lever 29 is disposed in alignment with one end of pivotally mounted hook member 27 while the other end has a recess 30 disposed therein. A trip lever 31 is pivotally mounted on shaft 11 and has one end disposed in recess 30. The other end of trip lever 31 is L-shaped and is engageable by an arm 32 secured on carriage 6. Arm 32, therefore, engages the L-shaped end of trip lever 31 causing lever 29 to be moved into engagement with hook member 27 to pivot this hook member against the bias of spring 28 to disengage hook member 27 from hook section 26 and spring 25 moves movable section 15 to its inoperative position.

Projections 33 are located on the upper surface of movable section 15. A data card DC is disposable between projections 33 on movable section 15 so that movable section 15 can move the data card into position between stationary contact section 7 and movable contact section 8. Guides 34 are located on stationary section 14 and movable section 15 in order to maintain the data card in position during the movement thereof between the contact sections.

A switch 35 is located at the inner end of stationary contact section 7 and includes an actuating member 36 engageable by the data card when in position between the contact sections to actuate switch 35. A pin 34a is located at the inner end of card-receiving area 2. Data card DC has one corner beveled and this beveled corner cooperates with pin 34a in order to properly position the data card within the card-receiving area and to operate switch 35. A guide member 37 extends across entrance 16 of data card-receiving area 2 and has a beveled surface in order to facilitate the introduction of the data card within entrance 16.

Copy slip-receiving section 3 has an entrance 38 provided with a guide member 39 extending thereacross which has a beveled surface in order to facilitate the insertion of copy slip CS into the copy slip-receiving section. Section 3 includes a floor 40 having a depression 41 therein. A guide 42 extends along the front end of floor 40 and along the side thereof opposite entrance 38 in order to maintain copy slip CS in position within section 3. A switch 43 is disposed in floor 40 and includes an actuating member 44 which is operated by copy slip CS when inserted in section 3.

A carriage 6 includes sides 45, a front end 46 and a cross member 47 extending between sides 45. Each of sides 45 has a channel 48 disposed therein in engagement with respective carriage-carrying members 4 for carriage 6 to move therealong. Cross member 47 has an elongated slot 49 disposed therein. A crank 50 has a pin 51 disposed in slot 49 while the other end of crank 50 is secured to a shaft 52 of a gear reduction unit 53 which is driven by a conventional AC synchronous motor (not shown). Gear reduction unit 53 is a conventional unit which drives shaft 52 of crank 50 at 15 revolutions per minute. Gear reduction unit 53 and the motor define a unitary assembly which is secured to member 5. Rollers 54 are mounted on cross member 47 in alignment with arms 9 and for engagement therewith as well as with arcuate extensions 13 to drive movable contact section 8 into engagement with stationary contact section 7. Arcuate extensions 13 are provided to press the contacts of movable contact section 8 through the coded perforations in the data cards so that the contacts engage the stationary contact members on stationary contact section 7. Elongated openings 10 in arms 9 permit movable contact section 8 to properly mate with stationary contact section 7 so that the contacts of contact section 8 make good electrical engagement with the contact members of contact section 7.

Printing roller 55 is mounted on a shaft 56 which is carried by a U-shaped frame 57. The free ends of frame 57 are pivotally mounted on carriage sides 45. Springs 58 are located on frame 57 to engage the ends of shaft 56 to hold printing roller 55 in position within arcuate recesses 59 in frame 57 to permit printing roller 55 to be readily replaced when necessary. Spring members 60 extend between front end 46 of carriage 6 and the bight of frame 57 in order to maintain printing roller 55 in a normally inoperative position. Lugs 61 are located on frame 57 opposite springs 58 and these lugs extend above the top surface of the legs of frame 57.

Latching lever 62 is disposed in slot 63 in each side 45 of carriage 6. Latching lever 62 includes a recess 64, a lug 65 that extends outwardly from sides 45 and a latching section 66 engageable with a lug 61. Latching lever 62 is held within slot 63 by means of a pin 67 which maintains latching lever 62 in position within slot 63 and delimits its movement therealong. Latching section 66 is movable outwardly from front end 46 and a leaf spring 68 engages latching sections 66 to bias latching levers 62 in a normally rearward direction. The bight of frame 57 extends outwardly from front end 46.

Figure 5:
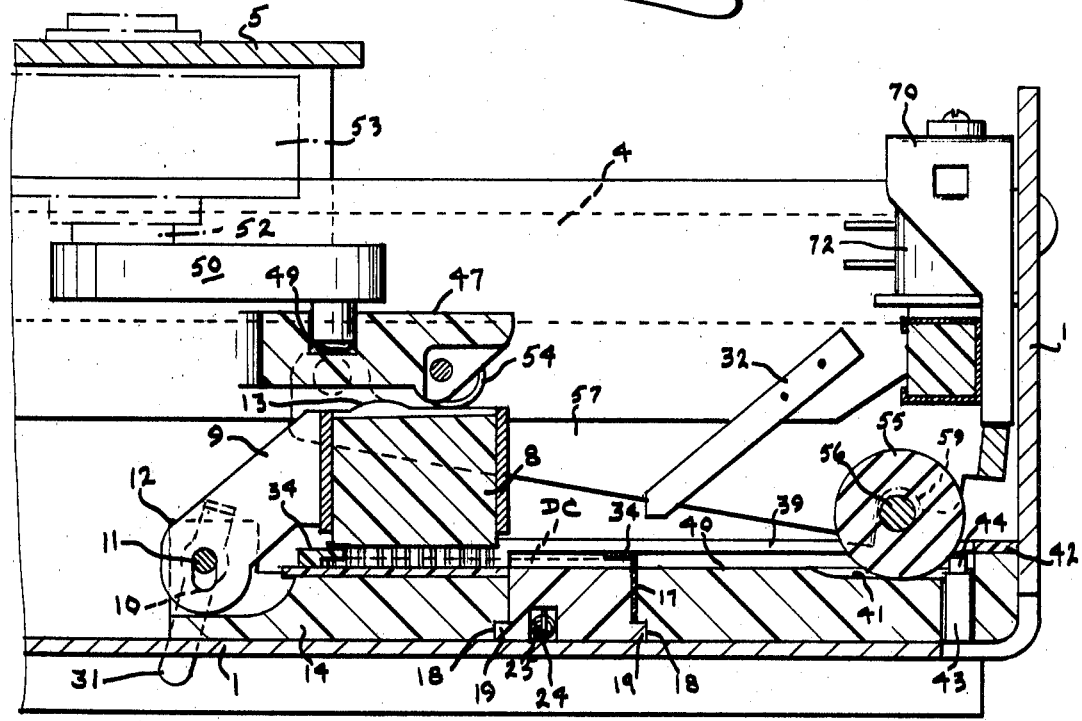

Latching sections 66 are disposed in engagement with the tops of lugs 61, as illustrated in FIG. 7, via leaf spring 68 when frame 57 is moved in a downward direction by means of the legs of a U-shaped frame 70 movably mounted on the short leg of base member 1, as illustrated in FIG. 5, in order to place printing roller 55 in depression 41. Printing roller 55 is held in this position by means of the printing roller latching means including lugs 61, latching section 66 and leaf spring 68 and the printing roller is held in this position during the rearward travel of carriage 6 until lugs 65 engage plates 69 which move latching levers 62 forwardly in slots 63 as carriage 6 continues in its rearward direction until latching sections 66 have moved free of lugs 61 against the bias of leaf spring 68 whereupon spring members 60 move frame 57 in an upward direction placing lugs 61 within recesses 64 of latching levers 62 thereby moving the printing roller out of a printing position.

Frame 70 is maintained in a normally inoperative position by means of a spring 71 and is moved into an operative position by means of a solenoid 72. A pin 73 is located on movable contact section 8 for engagement by arm 32 in order to move the movable contact section away from stationary contact section 7 and out of the path of the printing roller as carriage 6 is being moved in a rearward direction. A relief portion 74 is located in front end 46 of carriage 6 in order to provide clearance for solenoid 72.

Figure 8:
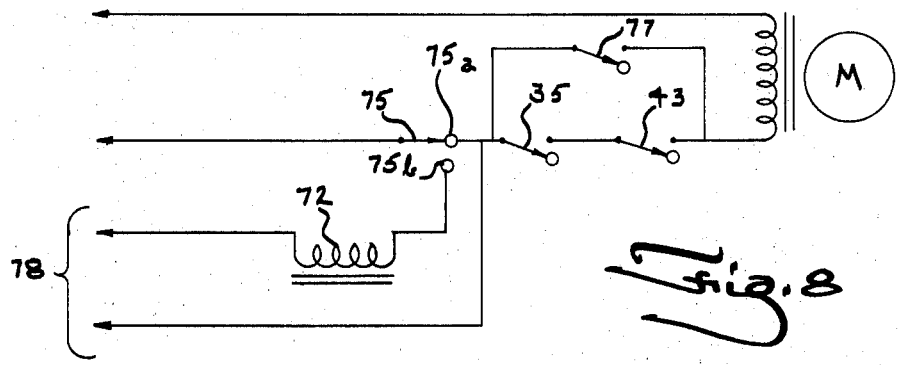
FIG. 8 is a schematic diagram of the electrical circuit of the card reader imprinter.

A switch 75 is secured on a carriage-carrying member 4 and has an actuating lever 76 which is engaged by a lug 65 of one of latching levers 62 to momentarily disrupt the source of supply to the drive motor and stop carriage 6 in its forwardmost position with the legs of frame 70 being disposed opposite the bight of frame 57, as illustrated in FIG. 5. A switch 77 (FIG. 8) similar to switch 75 has an actuating lever disposed in a position for engagement by crank 50 in order to stop motor M.

Figure 9:
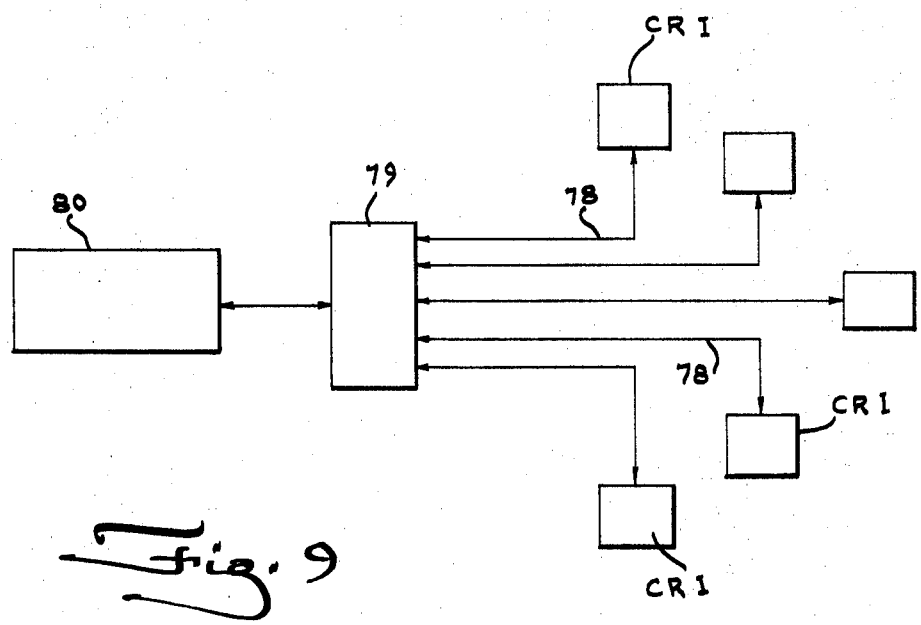
FIG. 9 is a diagrammatic representation of a credit system in which the card reader imprinter may be used.

FIG. 9 is a schematic representation of the connection of card reader imprinter CRI located, for example, at various locations in a department store. Card reader imprinters CRI are connected by conductor means 78 to a central electronic memory means 79 which, in turn, is connected to a computer 80 which feeds information into the electronic memory means which would be the account numbers of the customers and additional information as to the credibility of the customers. The account numbers are encoded on the data cards of the customers.

The operation of the card reader imprinter is according to the following:

Switches 35, 43 75 and 77 (FIG. 8) are shown in their normally inoperative positions before a data card and copy slip are inserted within data card-receiving area 2 and copy slip-receiving section 3. Data card DC is placed on movable section 15 between projections 33 and a copy slip CS is placed in copy slip-receiving section 3 which engages actuating member 44 to close switch 43. Movable section 15 is then pushed inwardly until hook section 26 is latched onto hook member 27 which places data card DC underneath the copy slip so that the embossed information on the data card is located underneath the imprinting area of the copy slip and the coded perforations of the data card overlie contact members of stationary contact section 7. The beveled corner of the data card polarizes with pin 34a and this permits the leading edge of the data card to engage actuating member 36 causing switch 35 to be closed. The closing of series switches 35 and 43, and with switch 75 in its closed condition, completes a circuit to motor M causing it to drive crank 50 in a clockwise direction. Pin 51 moving in slot 49 moves carriage 6 in a forward direction toward the front of the card reader imprinter. Motor M completes one-half a turn thereupon lug 65 engages actuating member 76 of switch 75 thereby moving the movable contact of switch 75 from contact 75a contact 75b causing the breaking of the circuit of motor M and preparing the circuit to solenoid 72.

As carriage 6 is being moved in a forward direction, rollers 54 engage arcuate extensions 13 to move movable contact section 8 into engagement with the data card and the contacts of movable contact section 8 extend through the coded perforations in the data card into engagement with the exposed contact members in stationary contact section 7 thereby reading the coded information on the data card and sending this information via leads 78 to memory means 79. If the customer's credibility is good, a signal is sent by one lead of conductor means 78 to solenoid 72 to actuate same causing the legs of frame 70 to engage the bight of frame 57 to move the printing roller into depression 41. Leaf spring 68 moves latching levers 62 in a rearward direction causing latching sections 66 to engage the tops of lugs 61 to maintain printing roller 55 in a downward position. Since latching levers 62 have been moved in a rearward direction, the movable contact of switch 75 is moved back to contact 75a thereby re-energizing motor M which makes another half revolution and moves carriage 6 in a rearward direction causing printer roller 55 to roll across copy slip CS to imprint the embossed information of the data card onto the copy slip which is verification that the card holder has a good credit rating.

Arm 32 engages pin 73 of movable contact section 8 as carriage 6 moves printing roller 55 in a rearward direction to move movable contact section 8 in an upward direction away from stationary contact section 7 to provide room for the printing roller to complete its cycle. After printing roller 55 has completed the printing operation, lugs 65 engage plates 69 causing latching levers 62 to be moved in a forward direction as carriage 6 is moving in a rearward direction. The movement of latching levers 62 relative to carriage 6 moves latching sections 66 out of engagement with the tops of lugs 61 so that lugs 61 move into recesses 64 under the influence of spring members 60, this action retracting printing roller 55 to an inoperative position.

Carriage 6 still continues in its rearward direction with arm 32 engaging trip lever 31 which moves lever 29 forward and pivots hook member 27 out of engagement with hook section 26 and spring 25 moves movable section 15 and the data card carried thereon in an outward direction which opens switch 35. Motor M continues to rotate until crank 50 engages switch 77 to move it to its open position thereby de-energizing the motor circuit and bringing motor M to a stop after it has moved crank 50 a complete revolution.

The foregoing describes the operation of the card reader imprinter when the credibility of the card holder is good. In the event that the credibility of a card holder is not good, the operation of the card reader imprinter is the same except that no signal is sent back to solenoid 72 to operate same but a signal is sent back over the other lead of conductor means 78 connected to contact 75a which energizes motor M causing the movable contact of switch 75 to be moved into engagement with contact 75a to continue operation of motor M to drive carriage 6 in a rearward direction but with printing roller 55 in a nonprinting position. If the embossed information on the data card is not imprinted on the copy slip, this signifies that the card holder's credit is not good.

As can be discerned from the foregoing, there has been described a unique and novel card reader imprinter which automatically is operated upon the insertion of a copy slip in a copy slip-receiving section of the card reader imprinter and the locking of the data card within the card-receiving area and the automatic determination of the credibility of the card holder. The card reader imprinter of the present invention operates within a small amount of time. No waiting, no secondary imprinting operation and no telephone lines are immobilized. The card holder is generally unaware that a credit check has been made, and, if the card holder's credibility is good causing the printing operation to be effected, this provides printed proof that a credit check was made before the sale was consummated.

What is claimed is:

1. A card reader-imprinter comprising: a frame, a card-receiving area within said frame and including first contact means upon which a card is placed, second contact means positioned initially above said first contact means, means for movably mounting said second contact means for movement relatively down upon the card to press the card against said first contact means and to read the coded information thereon, card-imprinting means for printing onto a record slip information on the card, means for initially positioning the card-imprinting means above said first contact means, means for movably mounting said card-imprinting means for movement along predetermined paths, drive means on said frame for displacing said second contact means and said card-imprinting means through a two-part cycle comprising a forward stroke and a reverse stroke, actuating means for selectively switching said card-imprinting means into either a printing condition or a non-printing condition with respect to said card and said record slip after said forward stroke and prior to said reverse stroke, said drive means moving said second contact means down upon the card and moving said card-imprinting means forwardly of the card and out of contact with the record slip during said forward stroke, during said reverse stroke the drive means further moving said second contact means up away from the card and drawing said card-imprinting means over the card to print or not print on the record slip depending upon the selected condition of said actuating means, and control means for starting said drive means at the beginning of said forward stroke and for stopping said drive means at the end of said reverse stroke to leave said second contact means and said card-imprinting means in their initial positions.

2. A card reader-imprinter according to claim 1 including means responsive to placement of the card in said card-receiving area and placement of the record slip in a printing position relative to the card for automatically operating said drive means.

3. A card reader-imprinter according to claim 1 wherein said card receiving area comprises a support member onto which the card is placed and means for mounting said support member for movement of the card into position on said first contact means, and wherein means are provided for latchably securing said support member in position.

4. The card reader-imprinter of claim 1 wherein said drive means includes means for moving said second contact means in a substantially arcuate path down upon the card and back up, and means for displacing said card-imprinting means in a substantially back and forth reciprocating path.

5. A card reader-imprinter according to claim 1 wherein means are provided on said imprinting means and adjacent said support member for tripping said latching means to permit said support member to move to a predetermined position when said imprinting means is moving along said reverse stroke to thereby move the card out of said card-receiving area.

6. A card reader-imprinter according to claim 1 wherein polarizing means are provided in said-receiving area and on the card to properly position the card in said card-receiving area.

7. A card reader-imprinter according to claim 1 wherein means are provided on said imprinting means and said second contact means to press contacts of said second contact means into engagement with the card and said first contact means during said two-part cycle.

8. The reader-imprinter of claim 1 wherein said control means includes switches for starting said drive means and for stopping it at the end of said forward stroke and for starting said drive means and for stopping it at the end of said reverse stroke to leave said second contact means and said imprinting means in their initial positions.

9. A card reader-imprinter comprising: a frame, a card-receiving area within said frame and including first support means upon which a card is placed, second card reading means positioned initially away from said first means, means for movably mounting said second means for movement relatively into engagement with the card to press the card against said first means and to read the coded information thereon, card-imprinting means for printing onto a record slip information on the card, means for initially positioning the card-imprinting means away from said first means, means for movably mounting said card-imprinting means for movement along predetermined paths, drive means on said frame for displacing said second means and said card-imprinting means through a two-part cycle comprising a forward stroke and a reverse stroke, actuating means for selectively switching said card-imprinting means into either a printing condition or a non-printing condition with respect to said card and said record slip after said forward stroke and prior to said reverse stroke, said drive means moving said second means into engagement with the card and moving said card-imprinting means forwardly of the card and out of contact with the record slip during said forward stroke, during said reverse stroke the drive means further moving said second means away from the card and drawing said card-imprinting means over the card to print or not print on the record slip depending upon the selected condition of said actuating means, and control means for starting said drive means at the beginning of said forward stroke and for stopping said drive means at the end of said reverse stroke to leave said second means and said card-imprinting means in their initial positions.

10. A card reader-imprinter as claimed in claim 9 wherein said first means comprises a support member onto which the card is placed and means for mounting said support member for movement of the card into position for reading of the coded information thereon by said second means, and wherein means are provided for latchably securing said support member in said reading position.

11. A card reader-imprinter as claimed in claim 10 wherein means are provided on said imprinting means and adjacent said support member for tripping said latching means to permit said support member to move to a predetermined position when said imprinting means is moving through said two-part cycle to thereby move the card out of said card-receiving area.

References Cited

UNITED STATES PATENTS

| 1,385,788 | 7/1921 | Kirshner | 101—306 |
|---|---|---|---|
| 2,691,938 | 10/1954 | Bliss | 101—94 |
| 2,714,201 | 7/1955 | Waitehead | 101—306UX |
| 2,792,148 | 5/1957 | Goldenberg | 101—269UX |
| 3,048,097 | 8/1962 | Miller | 101—269X |
| 3,058,416 | 10/1962 | Grant et al. | 101—269 |
| 3,083,641 | 4/1963 | Childs et al. | 101—269 |
| 3,173,362 | 3/1965 | Hu | 101—269 |
| 3,232,230 | 2/1966 | Sheldon | 101—269 |
| 3,262,124½ | 7/1966 | Albiani | 235—61.7(b) |
| 3,308,238 | 3/1967 | Bruthman | 340—147AX |

FOREIGN PATENTS 978,419  12/1964  Great Britain.

ROBERT E. PULFREY, Primary Examiner

J. R. FISHER, Assistant Examiner

U.S. Cl. X.R.

101—284